(12) United States Patent
Suermann et al.

(10) Patent No.: US 10,259,439 B2
(45) Date of Patent: Apr. 16, 2019

(54) ELECTRIC PARKING BRAKE CONTROL AND METHOD

(71) Applicant: Ford Global Technologies, LLC, Dearborn, MI (US)

(72) Inventors: Marc Suermann, Duisberg (DE); Jill Trappe, Nordrhein Westfalen (DE); Rudolf Daniels, Wermelskirchen (DE); Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/224,634

(22) Filed: Jul. 31, 2016

(65) Prior Publication Data
US 2017/0028975 A1    Feb. 2, 2017

(30) Foreign Application Priority Data
Jul. 30, 2015   (DE) .......................... 10 2015 214 458

(51) Int. Cl.
B60T 13/74   (2006.01)
B60T 7/04   (2006.01)
B60T 8/172   (2006.01)
B60T 8/1761   (2006.01)
B60T 13/58   (2006.01)
B60T 13/66   (2006.01)
B60T 17/22   (2006.01)

(52) U.S. Cl.
CPC .......... *B60T 13/741* (2013.01); *B60T 7/042* (2013.01); *B60T 8/172* (2013.01); *B60T 8/1761* (2013.01); *B60T 8/17616* (2013.01); *B60T 13/586* (2013.01); *B60T 13/662* (2013.01); *B60T 17/22* (2013.01); *B60T 2270/402* (2013.01)

(58) Field of Classification Search
CPC ........... B60T 2201/12; B60T 2201/122; B60T 2201/124; B60T 7/04; B60T 7/042; B60T 8/17; B60T 8/3255; B60T 8/3275
See application file for complete search history.

(56) References Cited

U.S. PATENT DOCUMENTS

| | | | |
|---|---|---|---|
| 6,270,171 B1 * | 8/2001 | Krieg .................. | B60T 7/12 303/113.3 |
| 2014/0156141 A1 * | 6/2014 | Yabuguchi ............ | B60T 7/02 701/36 |
| 2014/0277981 A1 * | 9/2014 | Svensson .............. | B60T 7/042 701/70 |

FOREIGN PATENT DOCUMENTS

| | | | | |
|---|---|---|---|---|
| DE | 102010001492 A1 | 8/2011 | | |
| DE | 102013204716 B3 * | 5/2014 | ............. | B60T 7/042 |
| DE | 102013207286 A1 | 10/2014 | | |

(Continued)

*Primary Examiner* — Vishal R Sahni
(74) *Attorney, Agent, or Firm* — Raymond L. Coppiellie; Burgess Law Office, PLLC

(57) ABSTRACT

A method for controlling an electric parking brake for a motor vehicle including a brake actuator having an electric motor disposed directly on the brake caliper. When the parking brake is utilized as an additional service brake, depending on a brake pedal brake command, the electric motor is initially energized on detection of an imminent or commencing brake-pedal actuation however the electric motor generates no braking force until a predetermined or specific brake command is received. As a result, an overload of the vehicle voltage source is avoided if simultaneous utilization of multiple parking-brake actuators occurs.

6 Claims, 1 Drawing Sheet

(56) References Cited

FOREIGN PATENT DOCUMENTS

DE 102013218401 A1 3/2015
WO WO-2012175468 A1 * 12/2012 ............ B60T 13/588

* cited by examiner

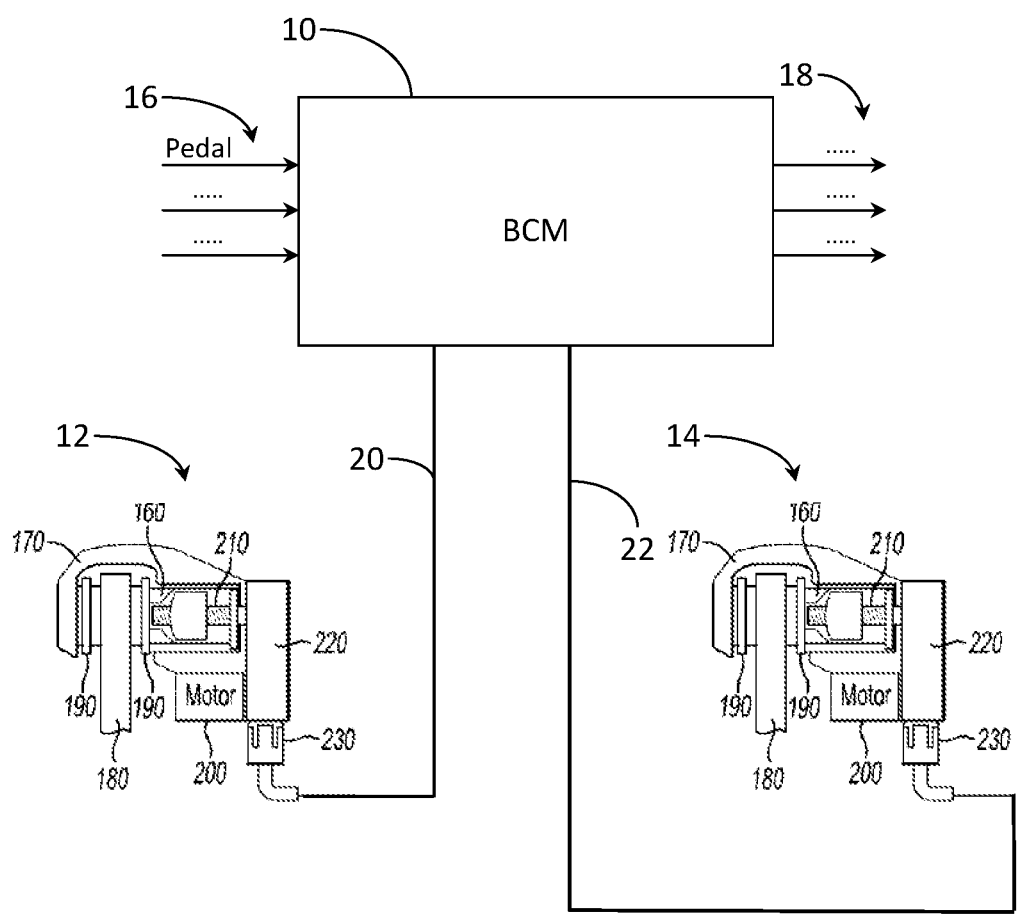

ELECTRIC PARKING BRAKE CONTROL AND METHOD

CROSS-REFERENCE TO RELATED APPLICATIONS

Not Applicable.

BACKGROUND OF THE INVENTION

1. Field of the Invention

An electric parking brake for a motor vehicle, and more specifically, a parking brake used as an additional service brake for vehicle deceleration.

2. Description of Related Art

In the field of motor vehicles, electric parking brakes are increasingly replacing conventional brake-cable parking brakes. Besides various advantages—like saving space regarding the operating elements and eliminating the brake cables—electrically controlled parking brakes can also be automatically activated and deactivated by an engine control unit independently of operator action and can also carry out other functions—like an automatic anti-roll-back device—during active vehicle operation.

It is known to use the parking brake as an additional service brake in certain situations in which the braking forces applied by the regular service brake are insufficient, e.g., if a technical disruption occurs or an insufficient residual stroke of a hydraulic main brake cylinder.

Electrically supported brake systems, using an electric motor instead of a conventional, vacuum-actuated brake booster, are in the field of service brakes. If the electric braking-force support failed, enough service-brake force through the hydraulic brake system is not always ensured, since with electrically supported brake systems, relatively low-volume tandem main cylinders are often used, which may not be capable of providing enough hydraulic fluid if failure of the electrical support occurs and manual actuation.

Independently thereof, if failure of the braking-force support occurs, the pedal travel and pedal forces increase, which can cause the driver of the vehicle ultimately applying insufficient braking forces. It can be useful to use the electric parking brake to apply supportive service-brake force.

Commonly used electric parking brakes are actuated by brake actuators, mounted directly on the brake disks of the wheels, wherein the actuators selectively press a brake shoe onto the brake disk or release the brake disk with a direct-current commutator motor. The conversion of the motor rotation into a linear motion is usually carried out through a reduction gear and a self-locking worm gear, and so the braking force can be maintained in a currentless state, in accordance with the requirements of a parking brake.

It is common to provide both rear wheels with such an electric-motor brake actuator. It is also possible to equip the front wheels or all wheels with such actuators.

Use of the electric parking brake as a service brake, may require a rapid activation of the parking brake during operation, i.e., the electric motors of the parking brake should build up the braking force with the maximum possible speed or the maximum possible torque.

SUMMARY OF THE INVENTION

A method of controlling a parking brake including providing an actuator having an electric motor. Initially energizing the actuator upon detection of brake pedal activation wherein upon initial energization the actuator generates no braking force.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a schematic layout of a parking brake system according to one example of the present invention.

DETAILED DESCRIPTION OF THE PREFERRED EMBODIMENTS

The following description of the preferred embodiment(s) is merely exemplary in nature and is in no way intended to limit the invention, its application, or uses.

The brake control module 10 receives, via inputs 16, a plurality of input signals, including for example a brake pedal sensor signal, and transmits, via outputs 18, a plurality of control signals for controlling an electric brake booster for a hydraulic service brake (not shown).

In addition, the brake control module contains electronic driver stages for controlling the brake actuators 12 and 14 via the twin-wire lines 20, 22. The current output at the commutator-direct current motors can be limited or adjusted via the driver stages with pulse-width modulation. Furthermore, the polarity can be selected for implementing an activation or release of the brake shoes. In the present example, the parking brake is used as an additional service brake depending on the brake command of a brake pedal. Upon detection of an imminent or commencing brake-pedal actuation, the electric motors are initially substantially simultaneously energized in such a way that, on further actuation of the brake pedal, a braking force is not generated before a braking force corresponding to the brake command is reached.

Therefore, the brake actuators 12, 14 are energized in and anticipatory manner, whereby the build-up of the motor-internal magnetic fields and the breakaway current are reduced in such a way to reduce vehicle current supply load.

As a result, the speed of response of the servomotors for the actual actuating command is increased.

Because, the current flowing through the lines 20, 22 is measured by the brake control module 10, the current position of the brake shoes is determined.

The brake actuators 12, 14 each have a brake caliper 170 and a brake cylinder 160. A rotating brake disk 180 disposed between the brake caliper 170 and brake cylinder 160 is selectively braked by brake pads 190 disposed on each side of the rotating brake disc 180. Movement of the brake cylinder 160 is initiated by a direct-current electric motor 200, that effectuates movement of the brake caliper 170 and the brake cylinder 160 via a gearbox 220 and a self-locking drive worm 210 connected to the lines 20, 22 via a plug and socket connector 230.

Simultaneous energization of the brake-actuator motors with maximum power can cause a brief voltage dip in the voltage supply of the vehicle, since these motors typically have relatively high inrush currents, which can be due to inductive effects (an initially lacking opposing magnetic field) and mechanically induced effects (application of breakaway current). Such brief voltage dips can affect other systems. Accordingly, it is desirable to avoid voltage-supply dips during the utilization of a parking brake as an additional service brake.

To avoid voltage dips in the event of a simultaneous activation of the motors 200 while allowing simultaneous activation of both brake actuators 12, 14, the brake actuators are pre-energized on detection of an imminent braking procedure where the parking brakes are required as additional brakes. Due to the substantially simultaneous energization, an asymmetrical braking behavior is avoided. During a normal use of a parking brake when the vehicle has stopped it makes no difference if the brake actuators 12, 14 are actuated one after the other in quick succession, and a voltage dip caused by sequential activation could be avoided.

The detection of a beginning brake-pedal actuation can mean that a suitable sensor finds even slight contact of the brake pedal by the foot of the driver or that the brake pedal must have been actuated by a certain, relatively slight amount of travel.

An actuation of the brake pedal can also be expected if a sudden release of the gas pedal occurs or another indication. In such a situation, the parking brake actuators can be proactively energized, where the latter pre-energization is preferably maintained only for a certain period, for example, until an actual brake-pedal actuation occurs or not. The level of confidence (possibly an imminent actuation due to a release of the gas pedal, contact with the brake pedal, or an actual commencing actuation) of pre-energization activation may be based on a weighing between carrying out a pre-energization as soon as possible and carrying out an needless pre-energization without actual braking.

In one example, energization of the actuator that does not yet generate a braking force can include a low current that, while energizing the coil of the servomotor, does not move the motor.

Alternatively, a slow movement of the motor, which does not yet lead to an application of the brake, may also be started. This movement must possibly be stopped or retracted again if a brake-pedal actuation found as being imminent does not occur.

In one example, the actuators of the parking brake can act on the rear-wheel axle and the braking force applied by the actuators can be limited in such a way reducing rear-wheel axle lockup. Rear axle lockup is undesirable for reasons related to driving dynamics. Furthermore, operation of the servomotors with high braking forces is avoided, as high braking forces can cause high current uptakes by the direct-current motors and can load the current supply.

Monitoring wheel slip and/or the wheel acceleration of the rear wheels, approximately in the manner of a well-known antilock brake system for the service brakes, helps reduce lockup of the rear-wheel axle.

In one example of the invention, the braking force applied by the actuators is limited to a specified maximum braking force that is below the maximum braking force that can be applied by the actuators. Here the maximum applicable braking force is reserved mainly for parking purposes, and the braking force applied during use as an additional service brake is limited in advance. For example, the braking force may be limited depending on substantially constant quantities such as the vehicle mass (with consideration for a trailer load, if necessary) or depending on variable quantities, such as the actual vehicle speed, the road incline (uphill/downhill), and/or the current coefficient of static friction μ.

Accordingly, states of the parking brake where the actuator motors are operated close to the lockup limit and have a very high current uptake, are avoided in advance.

Furthermore, as a result of the aforementioned limitations of the braking force, due to a type of antilock brake system and due to a specified maximum force, the actuating travel of the parking brake is reduced, which likewise has current-saving effects.

According to one example of the present invention, the parking brake may be used in a vehicle including an electrically supported, regular service brake (so-called "e-booster"). The parking brake can then be used as an additional service brake within the scope of a backup for the case where the proper performance of the regular service brake or the electric support is limited.

The invention can also be used in a useful manner for any other vehicle states where the parking brake is used besides or as a replacement for the service brake.

To avoid the occurrence of current peaks when the activated parking brake is released or the braking force is increased further while the parking brake is activated, if the braking-force requirement remains unchanged, the brake actuators remain energized so the braking force does not change. The motors are held in a type of standby state, which also increases the speed of response.

Furthermore, a control for carrying out an above-described method is proposed. The control can be a usual microprocessor-based control, which can also be part of a higher-order control and which exchanges highly diverse input and output signals with sensors or actuators.

The selective energization of the parking-brake actuators can be made possible with a pulse-width modulation of the output voltage, although a voltage regulation or the like is also conceivable.

The position of the parking brake actuators is usually estimated based on the current uptake of the motors, wherein, when the brakes are released, the brakes impact a stop and self-calibrate, and the position-status indicator is then reset. Alternatively, a dedicated position sensor can be provided.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling a parking brake comprising:
providing an actuator including an electric motor, said actuator coupled to said parking brake to generate a parking brake force;
providing a service brake and a service brake pedal;
pre-energizing the actuator to a pre-energized state upon detection of service brake pedal activation wherein the actuator generates no parking braking force during the pre-energized state.

2. The method as claimed in claim 1 wherein pre-energizing the actuator to a pre-energized state includes providing a low current that while energizing the coil of the electric motor does not move the motor.

3. The method as claimed in claim 1 wherein pre-energizing the actuator to a pre-energized state includes a regulation of the voltage to the electric motor whereby it does not move the motor.

4. The method as claimed in claim 3 wherein regulation of the voltage includes pulse-width modulation.

5. The method as claimed in claim 1 wherein when the service brake is activated and a braking-force requirement remains unchanged, pre-energizing the electric motor does not change the parking braking force.

6. The method as claimed in claim 1 wherein said parking brake includes at least two direct-current commutator motors wherein upon detection of service brake pedal actuation the motors are initially, simultaneously pre-energized.

* * * * *